(12) United States Patent
Saklatvala et al.

(10) Patent No.: US 10,726,349 B2
(45) Date of Patent: Jul. 28, 2020

(54) CALCULATING POSTERIOR PROBABILITY OF CLASSES

(71) Applicant: LONGSAND LIMITED, Cambridge (GB)

(72) Inventors: George Saklatvala, Cambridge (GB); Pashmina Cameron, Cambridge (GB)

(73) Assignee: LONGSAND LIMITED, Cambridge (GB)

( * ) Notice: Subject to any disclaimer, the term of this patent is extended or adjusted under 35 U.S.C. 154(b) by 609 days.

(21) Appl. No.: 15/524,149

(22) PCT Filed: Nov. 27, 2014

(86) PCT No.: PCT/EP2014/003166
§ 371 (c)(1),
(2) Date: May 3, 2017

(87) PCT Pub. No.: WO2016/082849
PCT Pub. Date: Jun. 2, 2016

(65) Prior Publication Data
US 2017/0323217 A1    Nov. 9, 2017

(51) Int. Cl.
*G06N 7/00* (2006.01)
*G06N 20/00* (2019.01)

(52) U.S. Cl.
CPC ............. *G06N 7/005* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 7,386,527 B2 | 6/2008 | Harris et al. | |
| 7,958,063 B2 | 6/2011 | Long et al. | |
| 8,311,956 B2 | 11/2012 | Sen et al. | |
| 8,315,453 B2 | 11/2012 | Shlain et al. | |
| 10,062,008 B2* | 8/2018 | Heusch | G06K 9/6277 |

(Continued)

FOREIGN PATENT DOCUMENTS

| | | |
|---|---|---|
| CN | 101630367 A | 1/2010 |
| CN | 102208030 A | 10/2011 |
| CN | 102647391 A | 8/2012 |

(Continued)

OTHER PUBLICATIONS

Nobuhiko Yamaguchi, "Combining pairwise coupling classifiers using individual logistic regressions", IEICE Technical Report, The Institute of Electronics, Information and Communication Engineers (IEICE), vol. 105, No. 658, Mar. 9, 2006, pp. 97-101.

(Continued)

*Primary Examiner* — Alan Chen

(57) ABSTRACT

A plurality of binary support vector machines (SVM) are trained to vote between two of a plurality of classes. Each of the binary SVMs vote between a different pair of the plurality of classes. A set of validated samples is input to each of the binary SVMs. The set of validated samples includes samples of each of the classes. Likelihood estimates are determined based on votes of the binary SVMs. A prior probability distribution (prior) is assigned for each of the classes. A posterior probability is calculated for each of the classes based on the determined likelihood estimates and the assigned priors.

20 Claims, 2 Drawing Sheets

(56) References Cited

U.S. PATENT DOCUMENTS

2009/0274376 A1* 11/2009 Selvaraj ............. G06K 9/00442
           382/224
2011/0255743 A1* 10/2011 Guan ................ G06K 9/00818
           382/103

FOREIGN PATENT DOCUMENTS

| EP | 2442258 | 4/2012 |
|---|---|---|
| JP | 2003-123025 A | 4/2003 |
| JP | 2006-511000 A | 3/2006 |

OTHER PUBLICATIONS

Agarwal, R. "A New Bayesian Ensemble of Trees Approach for Land Cover Classification of Satellite Imagery." Canadian Journal of Remote Sensing 39.6 (2014): 507-520.
International Search Report and Written Opinion; PCT/EP2014/003166; dated Jul. 24, 2015; 10 pages.
Kai-Bo Duan et al, "Which is the best multiclass SVM method? An Empirical study", Lecture nots in computer science; LNSC, May 26, 2005, pp. 278-285, Springer Verlag, Berlin /Heidelberg, XP019010395.
Xavier Ceamanos et al, 2A classifier ensemble based on fusion of support vector machines for calssifiying hyperspectral data, International Journal of Image and Data Fusion, Dec. 31, 2010, pp. 293-307, vol. 1, No. 4, XP055202328.
Zhang, L. et al, "An Improved Multi-Class Algorithm for SVMS", (Research Paper), Aug. 26-29,2004, pp. 3243-3247, vol. 5.
Zhang, Zhihua, and Michael I. Jordan. "Bayesian multicategory support vector machines." arXiv preprint arXiv:1206.6863 (2012).

\* cited by examiner

CALCULATING POSTERIOR PROBABILITY OF CLASSES

CLAIM FOR PRIORITY

The present application is a national stage filing under 35 U.S.C. § 371 of PCT application number PCT/EP2014/003166, having an international filing date of Nov. 27, 2014, the disclosure of which is hereby incorporated by reference in its entirety.

BACKGROUND

Support vector machines (SVMs) may be supervised learning models with associated learning algorithms that analyze data and recognize patterns, used for classification and regression analysis. Given a set of training examples, each marked as belonging to one of two categories, an SVM training algorithm may build a model that assigns new examples into one category or the other, making it a non-probabilistic binary linear classifier.

BRIEF DESCRIPTION OF THE DRAWINGS

The following detailed description references the drawings, wherein.

DETAILED DESCRIPTION

Figure 1:
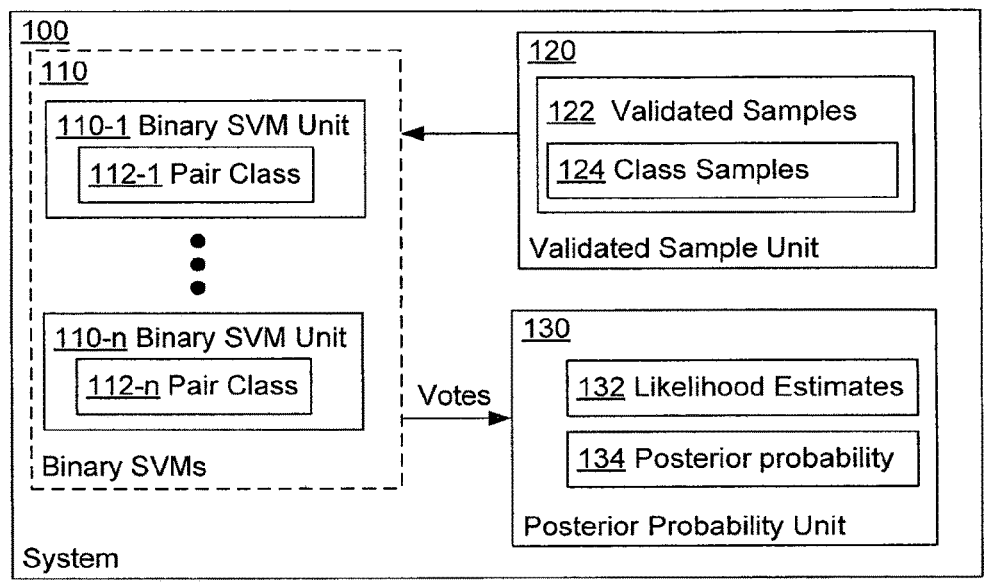
FIG. 1 is an example block diagram of a system to calculate a posterior probability of a plurality of classes.

Specific details are given in the following description to provide a thorough understanding of embodiments. However, it will be understood that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

A support vector machine (SVM) model may be a representation of the examples as points in space, mapped so that the examples of the separate categories are divided by a clear margin that is as wide as possible. New examples may then be mapped into that same space and predicted to belong to a category based on which side of the margin they fall on. There are generally two approaches to multi-class SVMs.

In the one-versus-one (OvO) approach, binary classifiers may be trained for every pair of classes. Each classifier may assign a sample to one of the two classes. The class with most votes overall wins. This approach may have the drawback of counting the votes from all classifiers equally, regardless of how much information the classifier actually provides. This also results in a score (the number of votes) that is not a very meaningful indication of the confidence of the classification.

In the one-versus-many (OvA) approach, a binary classifier may be trained between each class and a class made up of samples from all the other classes. Each classifier may return not only a vote from the multi-class SVM but a score representing the distance between the sample and the hyperplane that divides the classes, weighted by some calibration factor chosen such that the distances are comparable for different classes. The class with the highest score wins. This approach may have the drawback that SVMs perform significantly less well on heterogeneous classes than homogeneous ones. Also, the score may have no clear probabilistic interpretation.

Examples apply a support vector machine, which is intrinsically a binary classifier, to a multi-class classification problem. Here, examples may be based on the one-versus-one approach described above, where a binary classifier is trained for each pair of classes. However, instead of simply adding up the votes however, each binary classifier result may be used as an input to a Naive Bayes classifier, where the likelihoods are determined at training time by running the binary classifiers on a set of validation samples for each class.

An example method may train a plurality of binary support vector machines (SVM) to vote between two of a plurality of classes. Each of the binary SVMs may vote between a different pair of the plurality of classes. Next, a set of validated samples may be input to each of the binary SVMs. The set of validated samples may include samples of each of the classes. Also, likelihood estimates may be determined based on votes of the binary SVMs. Further, a prior probability distribution (prior) may be assigned for each of the classes. Lastly, a posterior probability may be calculated for each of the classes based on the determined likelihood estimates and the assigned priors.

Thus, examples may produce a meaningful and easily interpretable score for each class. Further, examples may not require any modification to the basic binary SVM algorithm. Further, examples may allow sub-classes to be trained with a higher degree of homogeneity than the classes of interest, which may enable better SVM performance and requires less training data. Also, examples may allow prior knowledge to be straightforwardly incorporated via Bayesian priors.

Referring now to the drawings, FIG. 1 is an example block diagram of a system 100 to calculate a posterior probability of a plurality of classes. The system 100 may be a microprocessor, a controller, a memory module or device, a notebook computer, a desktop computer, an all-in-one system, a server, a network device, a wireless device, and the like.

The system 100 is shown to include a plurality of binary support vector machines (SVM) units 110-1 to 110-$n$, where $n$ is a natural number, a validated sample unit 120 and a posterior probability unit 130. The plurality of binary SVM units 110-1 to 110-$n$, validated sample unit 120 and posterior probability unit 130 may include, for example, a hardware device including electronic circuitry for implementing the functionality described below, such as control logic and/or memory. In addition or as an alternative, the plurality of binary SVM units 110-1 to 110-$n$, validated sample unit 120 and posterior probability unit 130 may be implemented as a series of instructions encoded on a machine-readable storage medium and executable by a processor.

The plurality of binary SVM units 110-1 to 110-$n$ may vote between two of a plurality of classes. Each of the binary SVMs 110-1 to 110-$n$ may vote between a different pair 112-1 to 112-$n$, of the plurality of classes. The term class may relate to a way for grouping together similar types of data. Different classes may have different types of data. The binary SVM units 110-1 to 110-$n$ may include supervised learning models with associated learning algorithms that analyze data and recognize patterns. Given a set of training examples, each marked as belonging to one of two categories, a binary SVM unit 110 training algorithm may builds a model that assigns new examples into one category or the other, making it a non-probabilistic binary linear classifier.

The validated sample unit 120 may input a set of validated samples 122 to each of the binary SVMs 110-1 to 110-n. The set of validated samples 122 may include samples 124 of each of the classes. The type of class may already be known for the set of validated samples. The posterior probability unit 130 may calculate a posterior probability 134 for each of the classes using Bayesian inference and based on likelihood estimates 132 determined from votes of the binary SVMs 110-1 to 110-n in response to the set of validated samples 122.

Bayesian inference may relate to a method of inference in which Bayes' rule is used to update the probability estimate for a hypothesis as additional evidence is acquired. Bayes' rule may relate the odds of a first event to the odds of a second event, before (prior to) and after (posterior to) conditioning on a third event. The posterior probability of a random event or an uncertain proposition may be the conditional probability that is assigned after the relevant evidence or background is taken into account. The likelihood estimate may indicate a compatibility of the evidence with a given hypothesis. The likelihood estimate may be used when describing a function of a parameter given an outcome. Conversely, probability may be used when describing a function of the outcome given a fixed parameter value. The system 100 is explained in greater detail below with respects to FIGS. 2-4.

Figure 2:
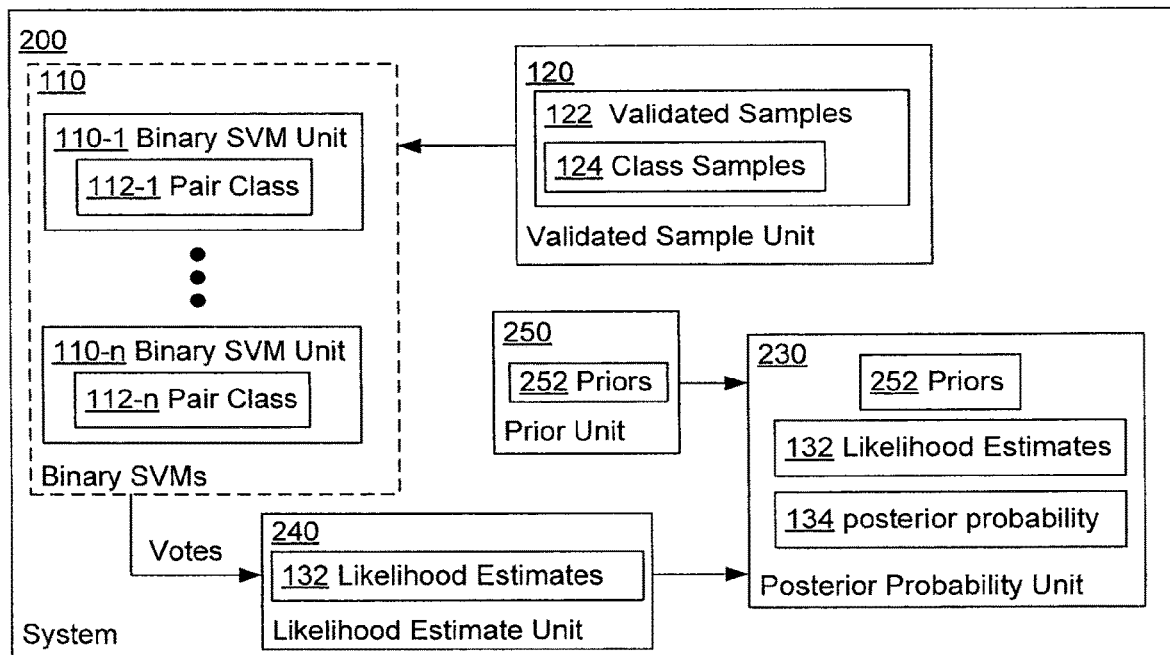
FIG. 2 is another example block diagram of a system to calculate a posterior probability of a plurality of classes.

FIG. 2 is another example block diagram of a system 200 to calculate a posterior probability of a plurality of classes. The system 200 may be a microprocessor, a controller, a memory module or device, a notebook computer, a desktop computer, an all-in-one system, a server, a network device, a wireless device, and the like.

The system 200 of FIG. 2 may include at least the functionality and/or hardware of the system 100 of FIG. 1. For example, system 200 includes the plurality of binary SVM units 110-1 to 110-n and the validated sample unit 120. Further, a posterior probability unit 230 of the system 200 of FIG. 2 includes at least the functionality and/or hardware of the posterior probability unit 130 of the system 100 of FIG. 1.

Also, the system 200 includes a likelihood estimate unit 240 and a prior unit 250. The likelihood estimate and prior units 240 and 250 may include, for example, a hardware device including electronic circuitry for implementing the functionality described below, such as control logic and/or memory. In addition or as an alternative, the likelihood estimate and prior units 240 and 250 may be implemented as a series of instructions encoded on a machine-readable storage medium and executable by a processor.

The likelihood estimate unit 240 may determine the likelihood estimates 132 for each class being voted in response to each class being input for each of the binary SVMs 110-1 to 110-n. The prior unit 250 may assign prior probability distributions 252 (priors) for each of the classes. The priors 252 may be determined, for example, using a distribution (fraction of samples of each class) of the set of validated samples 122 and/or obtained from prior knowledge of the classes.

The posterior probability unit 230 may calculate the posterior probability 134 for each of the classes further based on the priors 252. The prior may refer the probability distribution that would express one's uncertainty about an uncertain quantity before some evidence is taken into account. The system 200 is explained in greater detail below with respects to FIGS. 3-4.

Figure 3:
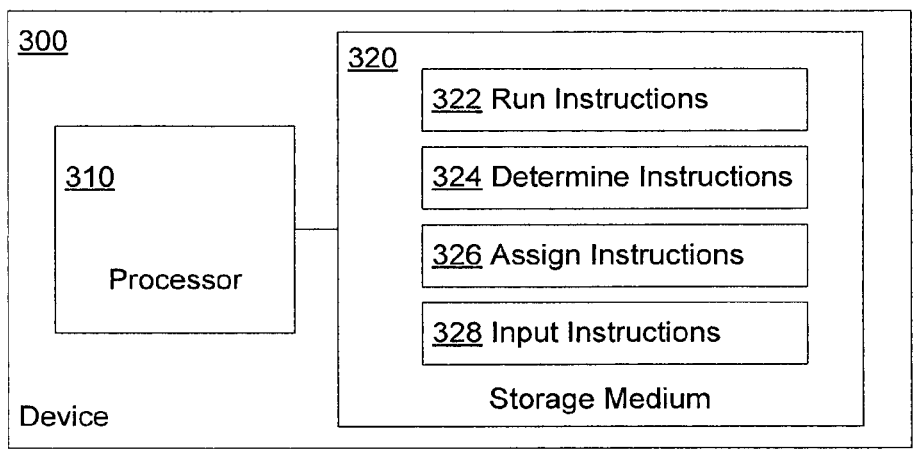
FIG. 3 is an example block diagram of a computing device including instructions for calculating a posterior probability of a plurality of classes.

FIG. 3 is an example block diagram of a computing device 300 including instructions for calculating a posterior probability of a plurality of classes. In the embodiment of FIG. 3, the computing device 300 includes a processor 310 and a machine-readable storage medium 320. The machine-readable storage medium 320 further includes instructions 322, 324, 326 and 328 for calculating the posterior probability of the plurality of classes.

The computing device 300 may be included in or part of, for example, a microprocessor, a controller, a memory module or device, a notebook computer, a desktop computer, an all-in-one system, a server, a network device, a wireless device, or any other type of device capable of executing the instructions 322, 324, 326 and 328. In certain examples, the computing device 300 may include or be connected to additional components such as memories, controllers, etc.

The processor 310 may be, at least one central processing unit (CPU), at least one semiconductor-based microprocessor, at least one graphics processing unit (GPU), a microcontroller, special purpose logic hardware controlled by microcode or other hardware devices suitable for retrieval and execution of instructions stored in the machine-readable storage medium 320, or combinations thereof. The processor 310 may fetch, decode, and execute instructions 322, 324, 326 and 328 to implement calculating the posterior probability of the plurality of classes. As an alternative or in addition to retrieving and executing instructions, the processor 310 may include at least one integrated circuit (IC), other control logic, other electronic circuits, or combinations thereof that include a number of electronic components for performing the functionality of instructions 322, 324, 326 and 328.

The machine-readable storage medium 320 may be any electronic, magnetic, optical, or other physical storage device that contains or stores executable instructions. Thus, the machine-readable storage medium 320 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 320 can be non-transitory. As described in detail below, machine-readable storage medium 320 may be encoded with a series of executable instructions for calculating the posterior probability of the plurality of classes.

Figure 4:
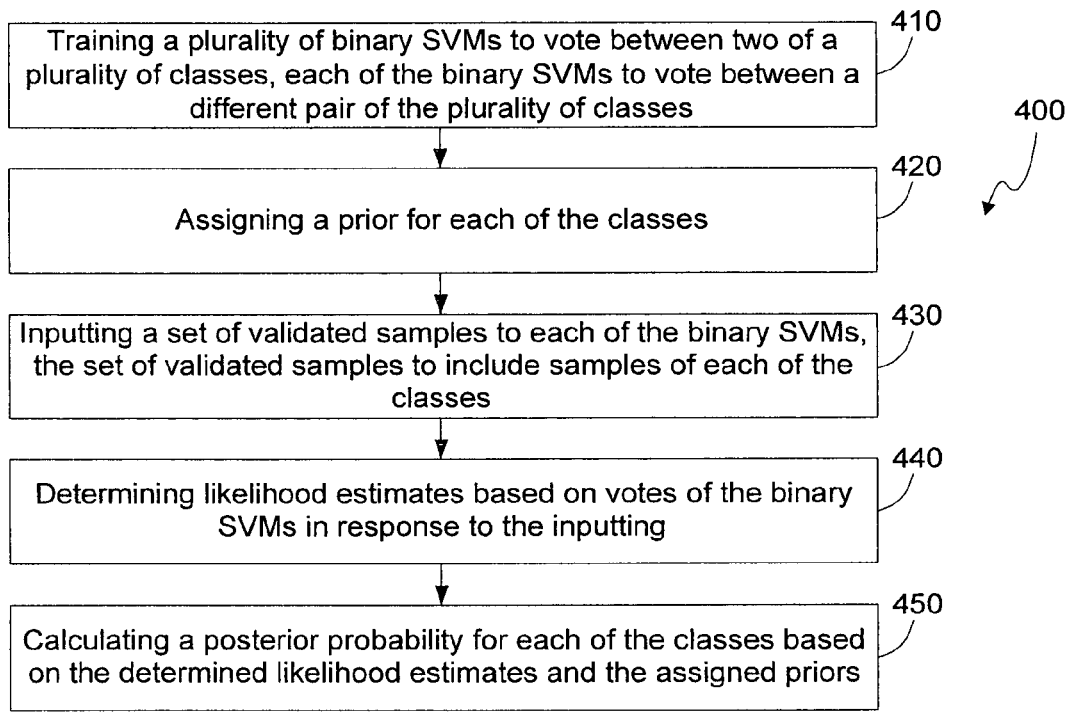
FIG. 4 is an example flowchart of a method for calculating a posterior probability of a plurality of classes.

Moreover, the instructions 322, 324, 326 and 328, when executed by a processor (e.g., via one processing element or multiple processing elements of the processor) can cause the processor to perform processes, such as, the process of FIG. 4. For example, the run instructions 322 may be executed by the processor 310 to run a set of validated samples against each of a plurality binary SVMs. Each of the binary SVMs may vote between a different pair of classes of a plurality of classes in response to the input set of validated samples. The classes of the validated samples may be known. The set of validated samples may include samples of each of the classes.

The determine instructions 324 may be executed by the processor 310 to determine likelihood estimates based on the votes of the binary SVMs. The assign instructions 326 may be executed by the processor 310 to assign a prior probability distribution (prior) for each of the classes. The priors of the plurality of classes may be normalized to sum to one. The input instructions 328 may be executed by the processor 310 to input the determined likelihood estimates and the assigned prior probabilities in to a Bayesian inference model to calculate a posterior probability for each of the classes.

FIG. 4 is an example flowchart of a method 400 for calculating a posterior probability of a plurality of classes. Although execution of the method 400 is described below with reference to the system 200, other suitable components for execution of the method 400 can be utilized, such as the system 100. Additionally, the components for executing the method 400 may be spread among multiple devices (e.g., a processing device in communication with input and output devices). In certain scenarios, multiple devices acting in coordination can be considered a single device to perform the method 400. The method 400 may be implemented in the form of executable instructions stored on a machine-readable storage medium, such as storage medium 320, and/or in the form of electronic circuitry.

At block 410, the system 200 trains a plurality of binary support vector machines (SVM) 110-1 to 110-$n$ to vote between two of a plurality of classes. Each of the binary SVMs 110-1 to 110-$n$ may vote between a different pair of the plurality of classes 112-1 to 112-$n$. For example, there may be 3 classes, such as classes A, B and C. Thus, there may be 3 SVMs 110-1 to 110-3, such as an AB classifier, AC classifier and BC classier. The AB classifier may vote between the pair of classes A and B. The AC classifier may vote between the pair of classes A and C. The BC classifier may vote between the pair of classes B and C.

At block 420, the system 200 assigns a prior probability distribution (prior) 252 for each of the classes, such as the priors 252 of the A, B and C classes. Next, at block 430, the system 200 inputs a set of validated samples 122 to each of the binary SVMs 110-1 to 110-$n$. The set of validated samples 122 may include samples of each of the classes, such as the classes A, B and C. For example, class A may represent images of cars, class B may represent images of bikes and class C may represent images of people.

In one example, the set of validated samples 122 may be different than a set of training samples used during the training of the plurality of binary SVMS 110-1 to 110-$n$. This may allow for the use of more homogeneous classes in the binary SVMs 110-1 to 110-$n$, e.g. classes where the in-class variation in the feature vectors is reduce. This may improve SVM performance and reduce the amount of training required.

The set of training samples may include a plurality of subclasses, with at least two of the subclasses corresponding to one of the classes. The training at block 410 may include training at least one of the plurality of binary SVMs 110 to distinguish between the two subclasses and to vote for the one class including the two subclasses, if at least one of the binary SVMs 110 identifies a sample as belonging to one of the two subclasses.

For example, super-classes, which may be conceptually linked but differ greatly in feature vectors, may be modelled in this way. For instance, the system 200 may train a visual classifier to distinguish the class of "cars" from the class of "non-cars." During the training at block 410, the system 200 may train separate sub-classes in step 1 for cars viewed from the front, cars viewed from the side, etc. Likewise, the system 200 may train a large number of different classes to represent "non-cars." However, at block 420, the vote of such a classifier in response to the validated sample set, would only be the "car" or "non-car" class.

At block 440, the system 200 determines likelihood estimates 132 based on votes of the binary SVMs 110-1 to 110-$n$. For instance, the system 200 may carry out the following steps to determine the likelihood estimates 132 of the first binary SVM 110-1. The system 200 may first determine a first number of votes for a first class of a pair of a first binary SVM 110-1 of the plurality of binary SVMs 110-1 to 110-$n$, in response to inputted validated samples 122 of the first class 124. For instance, the system 200 may determine a number of times the AB classifier votes for the A class, in response to receiving a number of samples of the A class.

The system 200 may also determine a second number of votes for a second class of the pair of the first binary SVM 110-1, in response to inputted validated samples 122 of the first class 124. For instance, the system 200 may determine a number of times the AB classifier votes for B class, in response to receiving a number of samples of the A class.

Then, the system 200 may divide the first number of votes by the number of inputted validated samples 122 of the first class 124 to determine a first likelihood estimate 132 of the first binary SVM 110-1 voting the first class given a validated sample of the first class. For instance, the AB classifier may have voted for the A class 8 times in response to receiving 10 samples of the A class. Here, 8 would be divided by 10 to give a likelihood estimate of 0.8 that the AB classifier would vote for the A class given a sample of the A class.

The system 200 may also divide the second number of votes by the number of inputted validated samples 122 of the first class 124 to determine a second likelihood estimate 132 of the first binary SVM voting for the second class given a validated sample of the first class. For instance, the AB classifier may have voted for the B class 2 times in response to receiving 10 samples of the A class. Here, 2 would be divided by 10 to give a likelihood estimate of 0.2 that the AB classifier would vote for the B class given a sample of the A class.

The above steps may repeated for each the remainder of the plurality of classes, using the validated samples 122 of the corresponding remainder of the classes 124, to calculate a remainder of the likelihood estimates 132 for the first binary SVM 110-1. For example, validated samples of the B class may be run against to the AB classifier to calculate a fraction of the times that the A class is chosen and the B class is chosen. Similar actions may also be carried out for the validated samples of the C class for the AB classifier, to determine a bias given a random input image.

Thus, the above steps calculate 6 likelihood estimates for the AB classifier: the likelihood estimates that the AB classifier would 1) choose the A class given the A class; 2) choose the B class given the A class; 3) choose the A class given the B class; 4) choose the B class given the B class; 5) choose the A class given the C class; and 6) choose the B class given the C class. The system 200 may carry out similar steps for the remainder of binary SVMs 110. Thus, according to this example, 6 likelihood estimates would be also calculated for the AC classifier and another 6 likelihood estimates would be calculated for the BC classifier.

Lastly, at block 450, the system 200 calculates a posterior probability 134 for each of the classes based on the determined likelihood estimates 132 and the assigned priors 252. For instance, the system 200 may first input a first sample to each of binary SVMs 110-1 to 110-$n$. This class of this first sample may be unknown. Then, the vote of each of the binary SVMs 110-1 to 110-$n$ may be determined in response to the inputted first sample. The vote may indicate one of the pair of classes for each of the binary SVMs 110-1 to 110-$n$. For example, in response to the first sample, the AB classifier may vote for the A class, the AC classifier may vote for the C class and the BC classifier may vote for the B class.

In order to calculate the posterior probability 134 of the first class, such as the A class, the system 200 may initially determine a non-normalized probability by multiplying the prior 252 of the first class by any of the likelihood estimates 132 related to the binary SVMs 110 that have pairs including the first class and that correspond to the determined vote for the binary SVM 110 given a sample of the first class. For example, assuming the AB, AC and BC classifier voted as indicated above, the terms to be multiplied for the non-normalized probability of A class may include the following: the prior of the A class, the likelihood estimate that the AB classifier voted for the A class given the first sample is the A class and the likelihood estimate that the AC classifier voted for the C class given the first sample is the A class. The BC classifier is not included here because the BC classifier cannot choose the A class.

Next, the system 200 may normalize the non-normalized probability to calculate the posterior probability of the first class, such as the A class. The system 200 may carry out the following steps for the normalizing. Initially, the system 200 may multiply each of the priors 252 with the likelihood estimate 132 that the class of the prior 252 is voted given the sample of the first class for one the binary SVMs 110 having the pair including the first class. For example, the system 200 may calculate the following 3 prior-multiplied terms: 1) the prior of the A class multiplied by the likelihood estimate that the AB classifier voted for the A class given the first sample is the A the class; 2) the prior of the B class multiplied by the likelihood estimate that the AB classifier voted for the A class given the first sample is the B the class; and 3) the prior of the C class multiplied by the likelihood estimate that the AB classifier voted for the A class given the first sample is the C the class.

Then, the system 200 may add all of the multiplied priors 252 to determine a first denominator. For example, the 3 prior-multiplied terms above may be added together to form a first denominator. Next, the system 200 may repeat the above multiplying and adding to calculate the multiplied priors 252 for any of a remainder of the binary SVMs 110 that have pairs including the first class, to determine a remainder of a plurality of denominators. For example, the system 200 may also calculate a second denominator relating to the AC classifier in a manner similar to the way the first denominator was calculated for the AB classifier. A denominator corresponding to the BC classifier is not included here because the BC classifier cannot vote for the A class. The term denominator may also be used interchangeably with the term evidence, with respect to Bayesian inference.

Afterward, the system 200 multiplies the plurality of denominators, such as the first and second denominators. Next, the system 200 divides the non-normalized probability by the multiplied plurality of denominators to determine a posterior probability 134 for the first class that is normalized. For example, the non-normalized probability of the A class would be divided by the multiplied first and second denominators to calculate the posterior probability of the A class.

The system 200 may repeat the steps for determining of the non-normalized probability and the determining the normalized probability for each of the remainder the plurality of classes hypothesized to be the first sample, given the likelihood estimates 132 for the determined vote of the respective binary SVMs 110 having pairs including the respective class, to determine a posterior probability 134 for each of the remainder of the classes. For example, the posterior probabilities of the B and C classes may be determined using steps similar to those for determining the posterior probability of the A class.

The priors 252 may be replaced with the corresponding posterior probabilities, for each of the classes, before a second sample is inputted to each of the binary SVMs 110-1 to 110-*n*. For example, the values for priors of the A, B and C may be replaced with the respective values of the calculated posterior probabilities of the A, B and C classes. Then, the process may be repeated for the next sample, such as the second sample.

We claim:

1. A method, comprising:
   training, by a processor, a plurality of binary support vector machines (SVMs) to vote between two of a plurality of classes, each of the binary SVMs to vote between a different pair of the plurality of classes;
   inputting, by the processor, a set of validated samples to each of the binary SVMs to generate votes for the set of validated samples, the set of validated samples to include samples of each of the plurality of classes;
   determining, by the processor, likelihood estimates for the plurality of classes based on the votes generated by PM the binary SVMs;
   assigning, by the processor, a prior probability distribution for each of the plurality of classes, wherein the prior probability distribution for each of the plurality of classes is determined based on a distribution of the set of validated samples obtained from prior knowledge of the plurality of classes; and
   calculating, by the processor, a posterior probability for each of the plurality of classes based on the determined likelihood estimates and the assigned prior probability distributions for the plurality of classes.

2. The method of claim 1, wherein determining the likelihood estimates includes:
   determining a first number of votes for a first class of a pair of the plurality of classes generated by a first binary SVM of the plurality of binary SVMs in response to the inputting of the set of validated samples;
   determining a second number of votes for a second class of the pair of the plurality of classes generated by the first binary SVM in response to the inputting of the set of validated samples;
   dividing the first number of votes by a total number of the validated samples to determine a first likelihood estimate of the first binary SVM voting the first class; and
   dividing the second number of votes by the total number of the validated samples to determine a second likelihood estimate of the first binary SVM voting for the second class.

3. The method of claim 2, wherein
   repeating the determining the first number of votes, the determining the second number of votes, the dividing the first number of votes, and the dividing the second number of votes for each remainder of the plurality of classes, to calculate a remainder of the likelihood estimates for the first binary SVM, and
   repeating the determining the first number of votes, the determining the second number of votes, the dividing the first number of votes, and dividing the second number of votes for each remainder of the binary SVMs to determine the likelihood estimates for each of the plurality of classes for the remainder of the binary SVMs.

4. The method of claim 3, wherein calculating the posterior probability includes:

inputting a first sample of the set of validated samples to each of the binary SVMs, and determining a vote of each of the binary SVMs in response to the inputted first sample, the vote to indicate one of the pair of classes for each of the binary SVMs.

5. The method of claim 4, wherein calculating the posterior probability further includes:

determining a non-normalized probability by multiplying the prior probability distribution for PM the first class by any of the likelihood estimates related to the binary SVMs that have pairs of classes including the first class.

6. The method of claim 5, wherein calculating the posterior probability further includes:

normalizing the non-normalized probability, the normalizing to include multiplying each of the prior probability distributions for each class with the likelihood estimate that the class is voted;

adding all of the multiplied prior probability distributions to determine a first denominator; and repeating the multiplying and the adding of the multiplied prior probability distributions for any of a remainder of the binary SVMs that have pairs of classes including the first class, to determine a remainder of a plurality of denominators.

7. The method of claim 6, wherein the normalizing further includes, multiplying the plurality of denominators; and dividing the non-normalized probability by the multiplied plurality of denominators to determine the posterior probability for the first class that is normalized.

8. The method of claim 7, wherein calculating the posterior probability further includes repeating the determining the non-normalized probability and determining the normalized probability for each remainder of the plurality of classes to determine the posterior probability for the remainder of the plurality of classes.

9. The method of claim 8, wherein the prior probability distribution for each of the plurality of classes is replaced with the calculated posterior probability for each of the plurality of classes before a second sample is inputted to each of the binary SVMs.

10. The method of claim 1, wherein the set of validated samples is different than a set of training samples used during the training of the plurality of binary SVMs.

11. The method of claim 10, wherein the set of training samples include samples of a plurality of subclasses, at least two of the subclasses are included in one of the plurality of classes, and wherein the training includes training one binary SVM of the plurality of binary SVMs to distinguish between the two subclasses and to vote for the one class that includes the two subclasses when the binary SVM identifies a sample of the set of training samples as belonging to one of the two subclasses.

12. The method of claim 1, wherein the prior probability distributions for the plurality of classes are normalized to sum to one.

13. A device comprising:

a processor; and a memory storing instructions that when executed cause the processor to:

train a plurality of binary support vector machines (SVMs) to vote between two of a plurality of classes, each of the binary SVMs to vote between a different pair of the plurality of classes;

input a set of validated samples to each of the binary SVMs to generate votes for the set of validated samples, the set of validated samples to include samples of each of the plurality of classes;

determine likelihood estimates for the plurality of classes based on the votes generated by the binary SVMs;

assign a prior probability distribution for each of the plurality of classes, wherein the prior probability distribution for each of the plurality of classes is determined based on a distribution of the set of validated samples obtained from prior knowledge of the plurality of classes; and calculate a posterior probability for each of the plurality of classes based on the likelihood estimates and the prior probability distributions for the plurality of classes.

14. The device of claim 13, wherein the instructions that cause the processor to calculate the posterior probability include the instructions that cause the processor to:

input the likelihood estimates and the prior probability distributions in to a Bayesian inference model to calculate the posterior probability for each of the plurality of classes.

15. The device of claim 13, wherein the instructions that cause the processor to determine the likelihood estimates include instructions that cause the processor to:

determine a first number of votes for a first class of a pair of the plurality of classes for a first binary SVM of the binary SVMs in response to the input of the set of validated samples;

determine a second number of votes for a second class of the pair of the plurality of classes for the first binary SVM in response to the input of the set of validated samples;

divide the first number of votes by a total number of the validated samples to determine a first likelihood estimate of the first binary SVM voting the first class; and divide the second number of votes by the total number of the validated samples to determine a second likelihood estimate of the first binary SVM voting for the second class.

16. The device of claim 13, wherein the set of validated samples is different from a set of training samples used during the training of the plurality of binary SVMs, the set of training samples being samples from two subclasses that are included in one of the plurality of classes, and wherein the instructions that cause the processor to train the plurality of binary SVMs include instructions that cause the processor to:

train one binary SVM of the plurality of binary SVMs to distinguish between the two subclasses and vote for the one class that includes the two subclasses when the binary SVM identifies a sample of the set of training samples as belonging to one of the two subclasses.

17. A non-transitory computer-readable storage medium storing instructions that, when executed by a processor of a device, cause the processor to:

input a set of validated samples to each of a plurality binary support vector machines (SVMs) to generate votes for the set of validated samples, each of the binary SVMs to vote between a different pair of a plurality of classes in response to the input of the set of validated samples;

determine likelihood estimates for the plurality of classes based on the votes PM generated by the binary SVMs;

assign a prior probability distribution for each of the plurality of classes, wherein the prior probability distribution for each of the plurality of classes is determined based on a distribution of the set of validated samples obtained from prior knowledge of the plurality of classes; and input the determined likelihood estimates and the assigned prior probability distributions in to a Bayesian inference model to calculate a posterior probability for each of the plurality of classes.

18. The non-transitory computer-readable storage medium of claim 17, wherein the set of validated samples include samples of each of the plurality of classes, the plurality of classes of the set of validated samples are known, and the prior probability distributions for the plurality of classes are normalized to sum to one.

19. The non-transitory computer-readable storage medium of claim 17, wherein the instructions that cause the processor to determine the likelihood estimates include instructions that cause the processor to:

determine a first number of votes for a first class of a pair of the plurality of classes for a first binary SVM of the binary SVMs in response to the input of the set of validated samples;

determine a second number of votes for a second class of the pair of the plurality of classes for the first binary SVM in response to the input of the set of validated samples;

divide the first number of votes by a total number of the validated samples to determine a first likelihood estimate of the first binary SVM voting the first class; and divide the second number of votes by the total number of the validated samples to determine a second likelihood estimate of the first binary SVM voting for the second class.

20. The non-transitory computer-readable storage medium of claim 17, wherein the prior probability distributions for the plurality of classes are normalized to sum to one.

* * * * *